(12) United States Patent
Rosales et al.

(10) Patent No.: US 12,164,367 B2
(45) Date of Patent: Dec. 10, 2024

(54) SYSTEMS, METHODS, AND DEVICES FOR REDUCING SYSTEMIC RISKS

(71) Applicant: Intel Corporation, Santa Clara, CA (US)

(72) Inventors: Rafael Rosales, Unterhaching (DE); Michael Paulitsch, Ottobrunn (DE); David Israel González Aguirre, Hillsboro, OR (US); Florian Geissler, Munich (DE); Ralf Graefe, Haar (DE)

(73) Assignee: Intel Corporation, Santa Clara, CA (US)

( * ) Notice: Subject to any disclaimer, the term of this patent is extended or adjusted under 35 U.S.C. 154(b) by 843 days.

(21) Appl. No.: 17/126,148

(22) Filed: Dec. 18, 2020

(65) Prior Publication Data

US 2021/0103487 A1    Apr. 8, 2021

(51) Int. Cl.
*G06F 11/00* (2006.01)
*G06F 11/07* (2006.01)
(Continued)

(52) U.S. Cl.
CPC .......... *G06F 11/076* (2013.01); *G06F 11/004* (2013.01); *G06F 11/0709* (2013.01); *G06F 16/9024* (2019.01); *G06N 7/01* (2023.01)

(58) Field of Classification Search
CPC ............... G06F 11/0176; G06F 11/004; G06F 11/079; G06F 11/076
(Continued)

(56) References Cited

U.S. PATENT DOCUMENTS

| 11,275,646 B1* | 3/2022 | Nguyen | G06N 3/088 |
| 2002/0111755 A1* | 8/2002 | Valadarsky | H04L 41/0604 |
| | | | 702/58 |

(Continued)

OTHER PUBLICATIONS

Hanif, Muhammad Abdullah et al., "SalvageDNN: salvaging deep neural network accelerators with permanent faults through saliency-driven fault-aware mapping", The Royal Society, Feb. 2020, 23 pages, vol. 378, Issue 2164, Philosophical Transactions of The Royal Society A.

(Continued)

*Primary Examiner* — Sarai E Butler
(74) *Attorney, Agent, or Firm* — VIERING, JENTSCHURA & PARTNER MBB

(57) ABSTRACT

A computer-implemented method may include obtaining, from a system using a middleware component of the system, run-time evidence of the system; applying the obtained run-time evidence to a Directed Acyclic Graph (DAG) Bayesian network to determine marginal probabilities for one or more nodes of the DAG Bayesian network, wherein the DAG Bayesian network comprises a plurality of nodes each representing states and faults of the system, wherein each node includes a parameterized conditional probability distribution, and wherein one or more of the nodes of the plurality of nodes specify a list of one or more safety goals and a safety value; determining which nodes representing faults have probabilities exceeding their specified safety value; and determining one or more risk mitigation techniques to activate for the determined nodes representing faults with probabilities exceeding their respective safety value.

15 Claims, 15 Drawing Sheets

(51) Int. Cl.
*G06F 16/901* (2019.01)
*G06N 7/01* (2023.01)

(58) Field of Classification Search
USPC .................................................... 714/1–57
See application file for complete search history.

(56) References Cited

U.S. PATENT DOCUMENTS

| | | | | |
|---|---|---|---|---|
| 2008/0282108 | A1* | 11/2008 | Jojic | G06F 11/3624 714/26 |
| 2010/0070800 | A1* | 3/2010 | Hanna | G06F 21/575 714/E11.133 |
| 2011/0153540 | A1* | 6/2011 | Beg | G06F 11/079 706/46 |
| 2011/0178977 | A1* | 7/2011 | Drees | G06Q 10/04 706/52 |
| 2012/0005532 | A1* | 1/2012 | Li | G06F 11/0709 714/E11.029 |
| 2014/0012784 | A1* | 1/2014 | Singliar | G06F 11/008 706/11 |
| 2015/0254125 | A1* | 9/2015 | Kakui | G06F 11/008 714/47.3 |
| 2016/0070807 | A1* | 3/2016 | Epstein | G06F 16/9535 707/706 |
| 2021/0182699 | A1* | 6/2021 | Koyyalummal | G06F 11/079 |

OTHER PUBLICATIONS

Lampis, M. et al.; "Bayesian belief networks for system fault diagnostics"; https://onlinelibrary.wiley.com/doi/epdf/10.1002/qre.978; Quality and Reliability Engineering; Abstract; retrieved on Dec. 10, 2020; vol. 25; Issue 4; 3 pages.

Chen, Zitao et al., "A Low-cost Fault Corrector for Deep Neural Networks through Range Restriction", Cornell University arXiv e-prints, arXiv: 2003.13874, Nov. 13, 2020, 13 pages, vol. 3.

Epifani, Iienia et al., "Model evolution by run-time parameter adaptation", IEEE, May 16-24, 2009, pp. 111-121, 2009 IEEE 31st International Conference on Software Engineering, Vancouver, BC, Canada.

Iso; "Road vehicles—Functional safety—Part 1: Vocabulary"; https://www.iso.org/standard/68383.html; Abstract; retrieved on Dec. 10, 2020; 4 pages; Issue 2.

Reich, Jan et al., "Engineering of Runtime Safety Monitors for Cyber-Physical Systems with Digital Dependability Identities", Computer Safety, Reliability, and Security, Sep. 2020, pp. 3-17, International Conference on Computer Safety, Reliability, and Security (SAFECOMP).

Khakad, Nima et al., "Dynamic safety analysis of process systems by mapping bow-tie into Bayesian network", Elsevier, 2013, pp. 46-53, Process Safety and Environmental Protection, vol. 91, Issues 1-2.

Misirli, Ayse Tosun et al., "Bayesian Networks For Evidence-Based Decision-Making in Software Engineering", IEEE, Jun. 2014, pp. 533-554, IEEE Transactions on Software Engineering , vol. 40, Issue 6.

Portinale, Luigi et al., "Bayesian Networks for Dependability Analysis: an Application to Digital Control Reliability", Cornell University arXiv e-prints, arXiv: 1301.6734, vol. 1, 8 pages, Jan. 23, 2013, https://arxiv.org/abs/1301.6734 (last visited Nov. 25, 2020).

Shugurov, Ivan; "Variational Inference: Foundations"; https://www.in.tum.de/fileadmin/w00bws/daml/seminars_ss17/inference/student_submissions/paper_final_shugurov.pdf.; retrieved on Nov. 25, 2020; 7 pages.

Trucco, P. et al., "A Bayesian Belief Network modelling of organisational factors in risk analysis: A case study in maritime transportation", Elsevier, Jun. 2008, pp. 823-834, Reliability Engineering & System Safety, vol. 93, Issue 6.

* cited by examiner

| Fault ID 510a | Unique reference to system element 510b | Incoming dependency edges (propagated faults) 510c | Parameterized conditional probability distribution of a node fault (on all incoming edges) 510d | List of annotated safety goals 510e |
|---|---|---|---|---|
| "kernelFault" | "OpenVINO Middleware inference engine kernel v10" | [I1=CPU1 fault, I2=OS fault] | p=[.01,0.3,0.5,0.6] ⇒ <br><br> \| I1 \| I2 \| P(K\|I1,I2) \| <br> \| \| \| T \| F \| <br> \| F \| F \| 0.1 \| 0.9 \| <br> \| F \| T \| 0.3 \| 0.7 \| <br> \| T \| F \| 0.5 \| 0.5 \| <br> \| T \| T \| 0.6 \| 0.4 \| | {SG1=[id="critical_CNN_safe_exec", fault_free_expectation_target=0.8]} |

| Reference to mitigation technique 610 | Applicable to faults (by Fault ID) 620 |
|---|---|
| Switch to algorithm B | ["Perception_odd_mismatch", "perception_corner_case"] |
| Skip sample | ["Perception_corner_case"] |
| Re-execute | ["Uncore_soft_error", "Core_logic_soft_error"] |
| Switch to a different middleware kernel for application execution | ["kernel_fault1"] |

| Fault ID | System element | Dependencies | Parameterized conditional probability distribution of a node fault | Safety goals |
|---|---|---|---|---|
| "kernelFault" | "OpenVINO Middleware inference engine kernel v10" | [I1=CPU1 fault, I2=OS fault, M1= Mit_tech_active_state] | p=[0.015,0.35,0.55,0.65,0.15,0.35,0.15,0.35]<br><br>P(F\|I1,I2,M1)<br>M1  I1  I2    T       F<br>F   F   F   0.015   0.985<br>F   F   T   0.35    0.65<br>F   T   F   0.55    0.45<br>F   T   T   0.65    0.35<br>T   F   F   0.015   0.985<br>T   F   T   0.35    0.65<br>T   T   F   0.15    0.85<br>T   T   T   0.35    0.65 | {SG1=<br>[id="critical_CNN_safe_exec", fault_free_expectation_target= 8]} |

| Mapping of an application task to a runtime kernel | Mapping of a runtime kernel to Processor\|CPU\|core | Mapping of an inter-task communication to a memory object | Mapping of a memory object to an address space | Activated fault mitigation techniques | Other configuration... |
|---|---|---|---|---|---|
| | | | | | |

FIG. 8

SYSTEMS, METHODS, AND DEVICES FOR REDUCING SYSTEMIC RISKS

TECHNICAL FIELD

Various embodiments relate generally to method, devices, and systems involving risk assessment

BACKGROUND

Violations of system safety goals can originate from different layers and components of a safety-critical system. The costs of hardware platforms that are created with a from the ground-up safety-process are significantly higher it is hard to scale solutions optimized to minimize risks for a particular application and context. The resulting performance of such designed platforms cannot match the computational power of commercial off-the-shelf high performance computing (HIPC) hardware.

Furthermore, it is generally not practical to implement risk mitigation techniques for all possible faults. This is because different faults require different solutions that have very expensive overhead costs in terms of hardware footprint (e.g., in terms of silicon area and power demand) and/or software overhead. For example, if the algorithmic sensitivity is high, a different algorithm is needed, whereas if a logic soft error occurred, e.g., a transient bit flip, mere re-execution suffices.

BRIEF DESCRIPTION OF THE DRAWINGS

In the drawings, like reference characters generally refer to the same parts throughout the different views. The drawings are not necessarily to scale; emphasis instead generally being placed upon illustrating the principles of the invention. In the following description, various embodiments of the invention are described with reference to the following drawings, in which:

FIG. 5 shows an exemplary representation of a node according to aspects of the present disclosure.

FIG. 6 shows an exemplary look-up-table according to aspects of the present disclosure.

FIG. 7 shows an exemplary representation of a node according to aspects of the present disclosure.

FIG. 8 is exemplary table 800 having examples of runtime evidence according to aspects of the present disclosure.

DESCRIPTION

Figure 1:
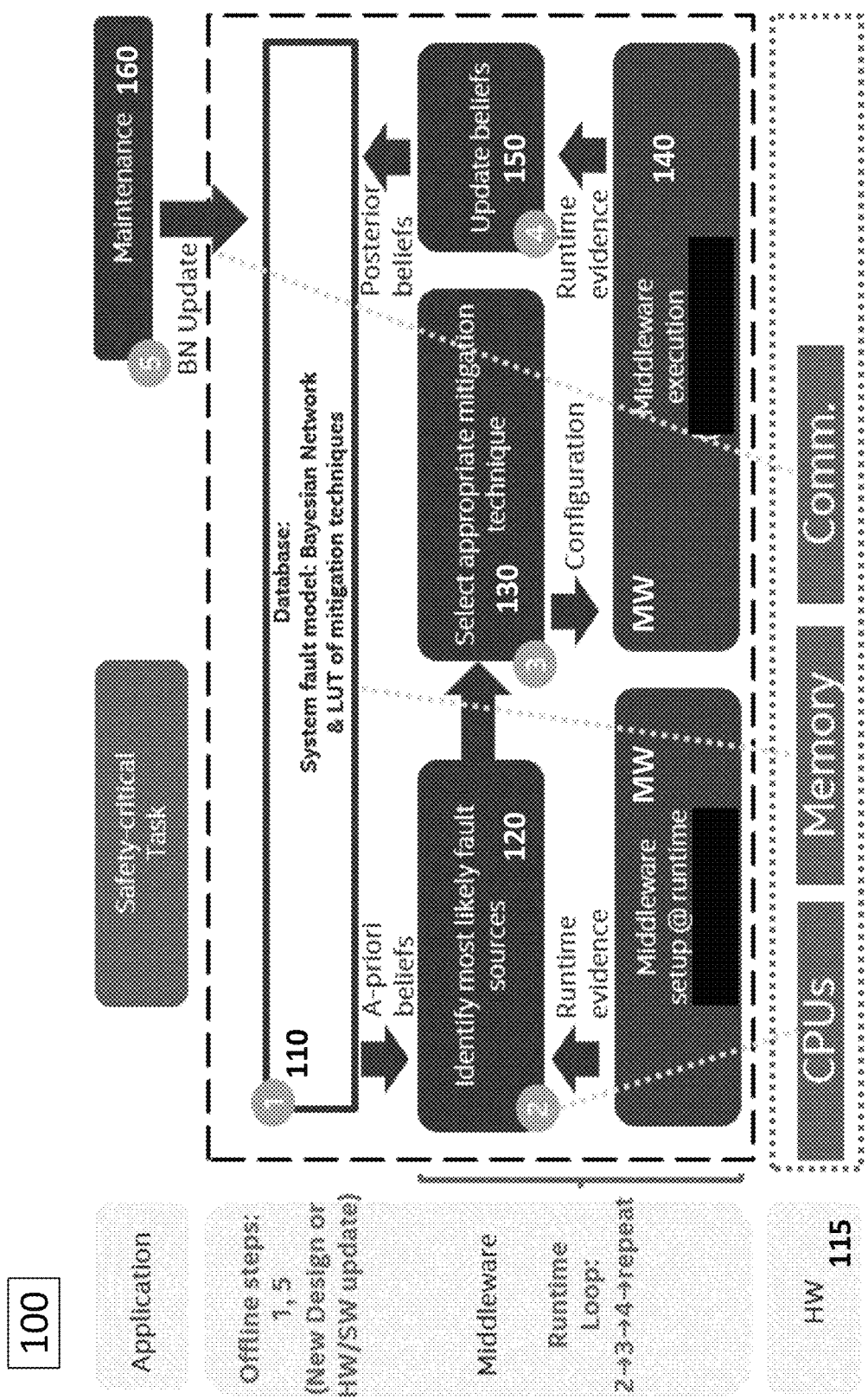
FIG. 1 shows an exemplary process or method 100 for minimizing or reducing risk in a system in accordance with aspects of the present disclosure.

The following detailed description refers to the accompanying drawings that show, by way of illustration, specific details and embodiments in which the invention may be practiced.

The word "exemplary" is used herein to mean "serving as an example, instance, or illustration." Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one. The terms "proper subset", "reduced subset", and "lesser subset" refer to a subset of a set that is not equal to the set, i.e. a subset of a set that contains less elements than the set.

As used herein, "memory" are understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory, and thus may refer to a collective component comprising one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

Exemplary embodiments of the present disclosure can be realized by one or more computers (or computing devices) reading out and executing computer-executable instructions recorded on a storage medium (e.g., non-transitory computer-readable storage medium) to perform the functions of one or more of the herein-described embodiment(s) of the disclosure. The computer(s) may comprise one or more of a central processing unit (CPU), a microprocessing unit (MPU), or other circuitry, and may include a network of separate computers or separate computer processors. The computer-executable instructions may be provided to the computer, for example, from a network or a non-volatile computer readable storage medium. The storage medium may include, for example, one or more of a hard disk, a random-access memory (RAM), a read-only memory (ROM), a storage of distributed computing systems, an optical drive (such as a compact disc (CD), digital versatile disc (DVD), or Blu-ray Disc (BD), a flash memory device, a memory card, and the like. By way of illustration, specific details and embodiments in which the invention may be practiced.

As utilized herein, terms "module", "component," "system," "circuit," "element," "slice," "circuitry," and the like are intended to refer to a set of one or more electronic components, a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuits can reside within the same circuitry, and circuitry can be localized on one computer and/or distributed between two or more computers. A set of elements or a set of other circuits can be described herein, in which the term "set" can be interpreted as "one or more."

As another example, circuitry or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, circuitry can be an apparatus that provides specific functionality through electronic components without mechanical parts; the electronic components can include one or more processors therein to execute executable instructions stored in computer readable storage medium and/or firmware that confer(s), at least in part, the functionality of the electronic components.

As used herein, a signal that is "indicative of" a value or other information may be a digital or analog signal that encodes or otherwise communicates the value or other information in a manner that can be decoded by and/or cause a responsive action in a component receiving the signal. The signal may be stored or buffered in computer readable storage medium prior to its receipt by the receiving component and the receiving component may retrieve the signal from the storage medium. Further, a "value" that is "indicative of" some quantity, state, or parameter may be physically embodied as a digital signal, an analog signal, or stored bits that encode or otherwise communicate the value.

As used herein, a signal may be transmitted or conducted through a signal chain in which the signal is processed to change characteristics such as phase, amplitude, frequency, and so on. The signal may be referred to as the same signal even as such characteristics are adapted. In general, so long as a signal continues to encode the same information, the signal may be considered as the same signal. For example, a transmit signal may be considered as referring to the transmit signal in baseband, intermediate, and radio frequencies.

As used herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate or transform data represented as physical (e.g., electronic) quantities within the computer's registers and/or memories into other data similar represented as physical quantities within the computer's registers and/or memories or other information storage medium that may store instructions to perform operations and/or processes.

FIG. 1 is a diagram of an exemplary process or method 100 to minimize or reduce risk in a system (e.g., safety-critical system). The process may be implemented by a computing platform or hardware element (HW) that includes one or more processors (e.g., CPUs), memories, and a communication interface which can be used processing for transmitting and receiving data or data signals according to the method 100. FIG. 1 shows a general understanding of the process, with more detailing explaining the process being described later. The method 100 may be implemented for reducing risk in safety-critical tasks that are performed by the system.

The method or process 100 may include at 110, providing a Directed Acyclic Graph (DAG) Bayesian network and a look-up-table (LUT). The DAG Bayesian network can correspond or describe an apriori fault model of the system. The DAG Bayesian network includes nodes representing states and faults of the system. Each node may include a parameterized conditional probability distribution and can wherein one or more the nodes of the plurality of nodes specify one or more safety goals and a safety value or safety threshold value. The parameterized conditional probability can include an apriori probability representing a set of possible values or condition for the node, such as, for example, a presence or absence of a fault in a particular system state. This probability distribution can be conditioned by the combination of possible values of all incoming dependencies.

The LUT or LUT data structure indicates a mapping of one or more risk mitigation techniques to one or more of the nodes of the DAG Bayesian Network. Both the DAG Bayesian network and LUT may be stored in any suitable and accessible (e.g., non-volatile) storage device(s). The HW (e.g., one or more processors implementing the process) can access the storage device(s) that contain the DAG Bayesian network and the LUT.

According to aspects of the present disclosure, the DAG Bayesian network may be further extended based on the mapping of mitigation techniques to nodes indicated or reflected in the LUT. To extend the DAG Bayesian Network the effects of mitigation techniques can be incorporated with the relevant affected nodes including an extra system state. The conditional probability distribution of the nodes affected by mitigation techniques can be extended with the foreseen impact of triggering or not the mitigation technique. Accordingly, the probability distribution can include information on the reduction or increase of risks due to the introduction of dynamically triggerable mitigation technique(s) and the activation or non-activation of the mitigation technique(s).

The system for which risk is to be reduced may include a middleware component or simply middleware (MW). The middleware may be any appropriate or suitable middleware component integrated in the system and that can interface with the other various parts or components of the system. In particular, the middleware can be configured to obtain run-time evidence of the system. Run-time evidence may be diagnostic data or other similar types of evidence or data gathered from hardware components and software components. The runtime evidence may include data regarding the states, functionalities, etc. of the system's various components. For example, run-time evidence or data can include or indicate runtime decisions, such as exact mapping of tasks to processor(s), memory allocation(s), selection of runtime kernel(s), and instructions used.

At 120, the method or process includes identifying likely fault sources of the system. This identification can be accomplished by obtaining the runtime evidence from the middleware and applying the obtained run-time evidence to a DAG Bayesian network described herein. The results of applying the run-time evidence to the DAG Bayesian Network includes computing marginal probabilities indicating likely causes of faults. Then identification of the potential source(s) of faults can be done by using the computed or calculated probabilities. Based on the identification, one or more risk mitigation techniques to reduce safety risk in the system can be selected. The middleware, for example, can be configured to implement the one or more selected risk mitigation techniques in the event of the corresponding failure(s).

At 140, if the selected risk mitigation technique(s) are implemented during runtime, then at 150, the DAG Bayesian Network may be updated based on the resultant effects of the implemented risk mitigation technique(s). Finally, at 160, maintenance may be performed with changes error and vulnerability databases regarding the system being used to update the beliefs and/or the Bayesian Network structure.

Figure 2:
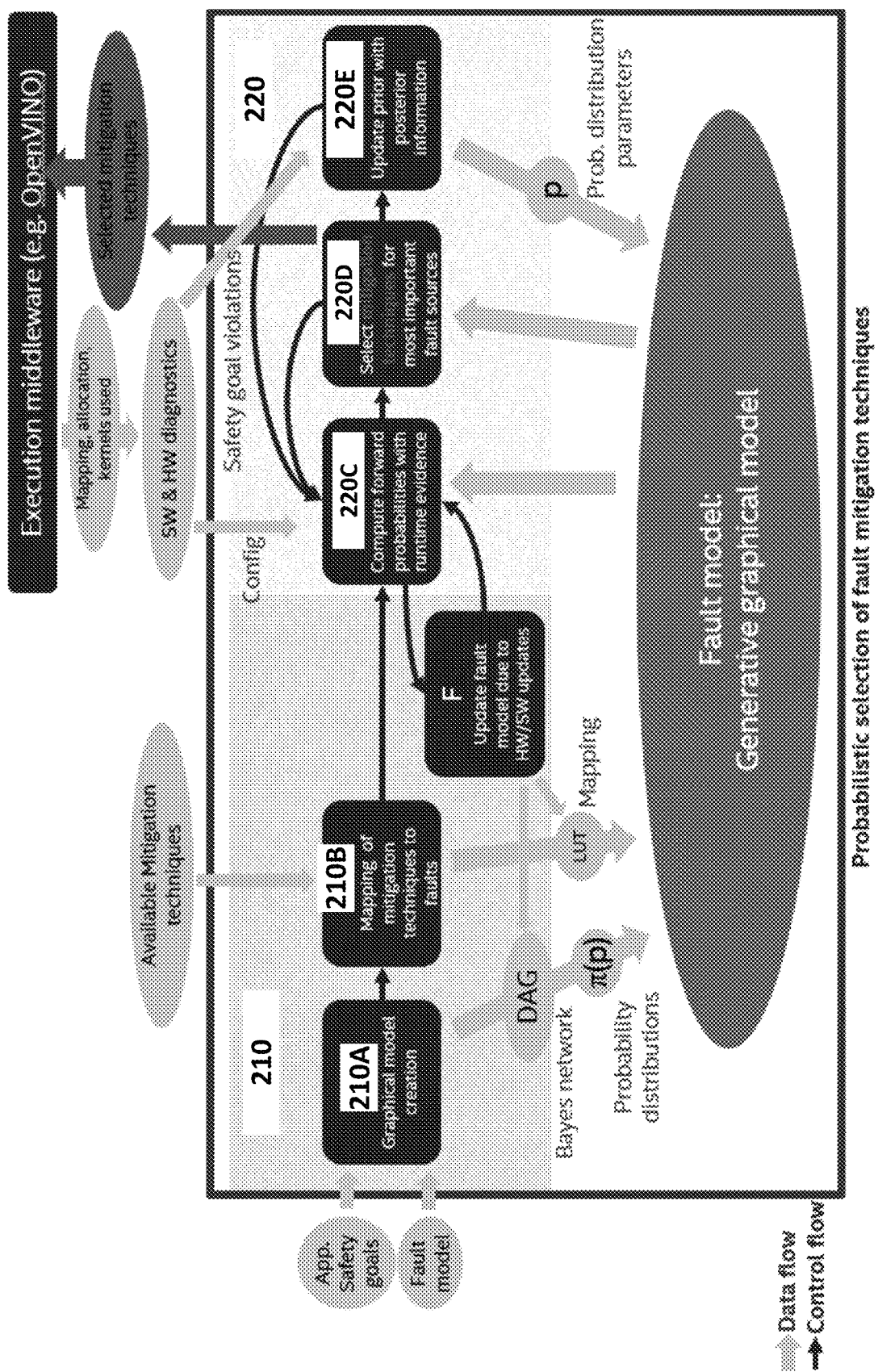
FIG. 2 shows an exemplary flow diagram illustrating the selection of mitigation techniques described in connection with FIG. 1.

FIG. 2 shows a flow diagram illustrating the creation and interpretation of uncertainty information to select mitigation techniques described in connection with the method 100 of FIG. 1. The flow or aspects thereof depicted in FIG. 2 may be performed by a hardware or software such as a computing system, e.g., one or more processors, one or more memories, or other suitable or needed components for implementation.

In FIG. 2, at 210, a fault model and look-up-table (LUT) for a system is created. As shown, first at 210A, a system fault model is created that includes application safety goal violations that can be traced back to the source of the faults. Examples of potential sources of faults may be hardware components, operating system(s) (OS), runtime inference engine framework configurations, application software, etc.

The fault model can then be transformed into a Directed Acyclic Graph (DAG) Bayesian Network (e.g., a generative graphical model) that is annotated with apriori information on the conditional probabilities of faults and fault propagations using parameterized probability distribution models.

In aspects of the present disclosure, the nodes of DAG Bayesian Networks described herein can represent a system state or potential faults of application(s), hardware platform(s), software platform(s), data object corruption, system state(s), and/or undesired environment state(s). The edges of the DAG Bayesian Network can represent and describe causal relationships, such as fault propagations, across the hierarchy, levels of abstraction, and dependencies of a system. In one example, an Operating System (OS) may fail if a CPU fails, or a task may fail if the previous task fails.

Figure 3:
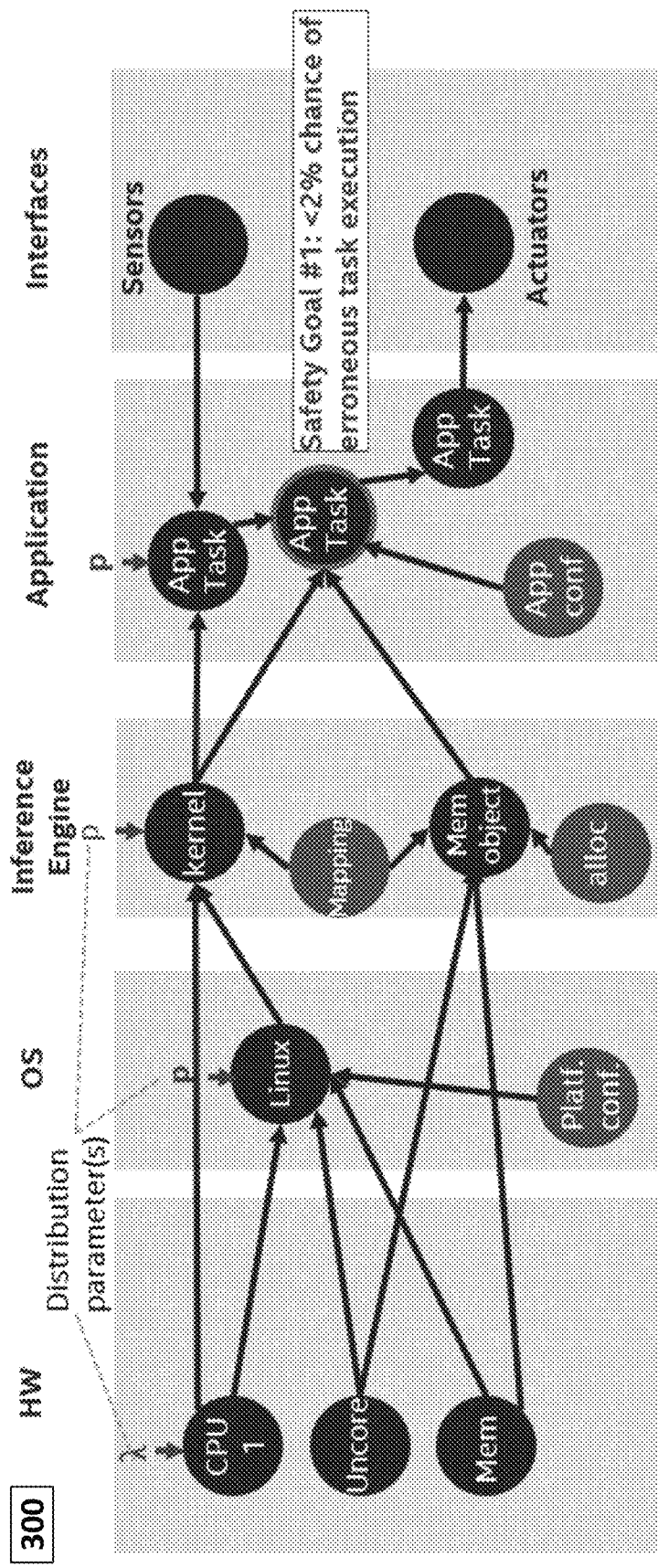
FIG. 3 shows an exemplary representation of a Bayesian Network in accordance with aspects of the present disclosure.

FIG. 3 depicts an exemplary representation of a DAG Bayesian Network. The Bayesian Network with each node modeling a parameterized distribution of the conditional probability of incoming faults and system states. The system safety goals can be annotated to the respective nodes.

Faults captured in the DAG Bayesian Network can contain systematic and aleatoric faults for software, hardware, input data, and context mismatches. The DAG Bayesian Network may capture all or as many as possible sources of failure in the system, including faults related to, for example, the Safety of Intended Functionality (SOTIF), where the uncertainty in the specification completeness, e.g., in problems in the training data of machine learning techniques, are considered.

Figure 4:
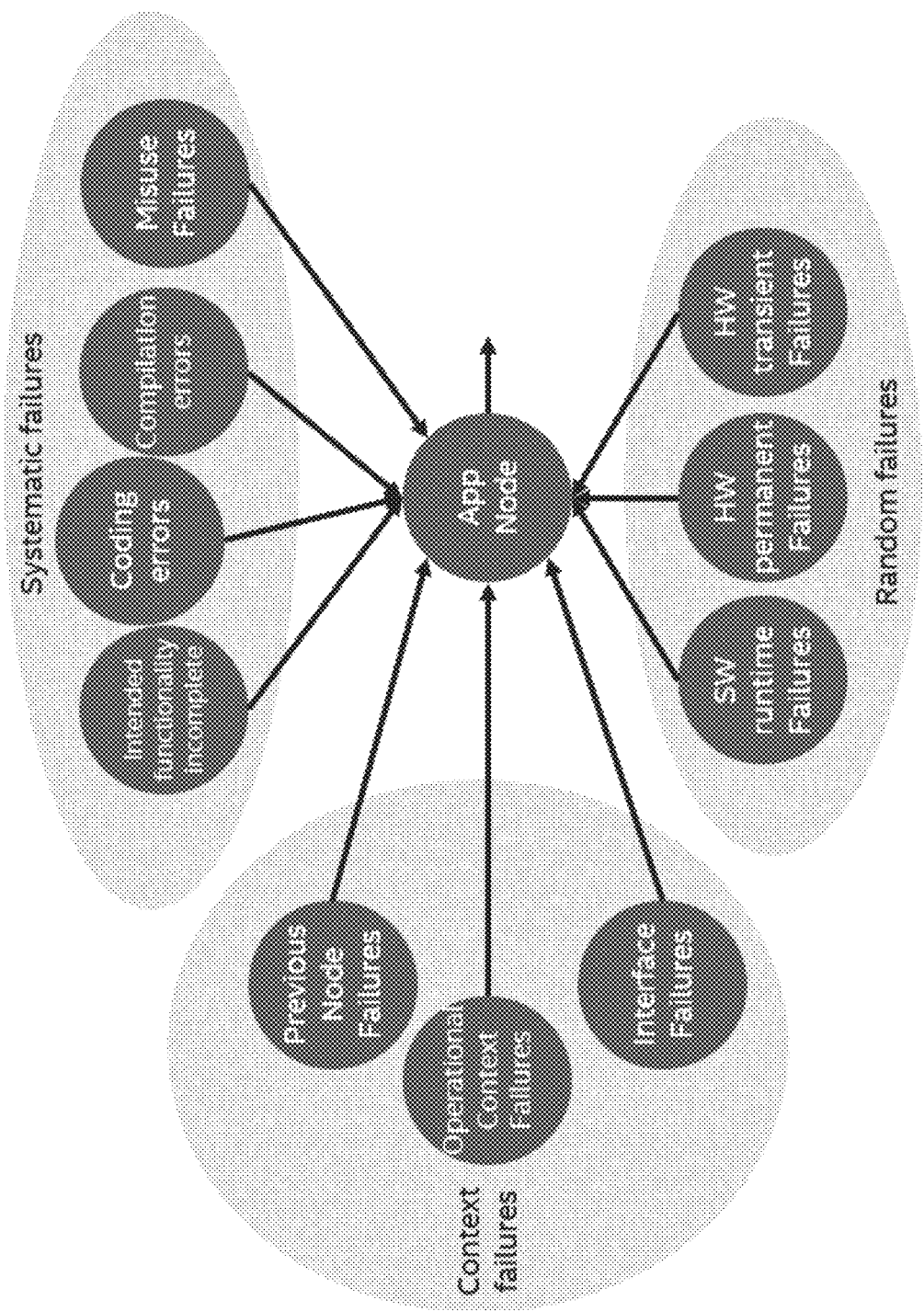
FIG. 4 is an exemplary diagram showing exemplary categories of faults propagating to an application node in accordance with aspects of the present disclosure.

FIG. 4 shows exemplary categories of faults propagating to an application node which may be included in DAG Bayesian Networks described herein. System states can represent relevant conditions for triggering of faults, such as OS or platform configuration or runtime framework decisions, e.g., mappings of tasks to processors. In some cases, a DAG Bayesian Network can be defined through a manual functional and architectural analysis where potential cause-and-effect relationships are identified. In other cases, automatic approaches may be employed that can exploit available fault models as sources of structural information through mapping algorithms, e.g., from a fault tree or a bow-tie fault model.

In the initial creation of a DAG Bayesian Network, a conditional probability distribution can be specified for each node. In aspects of the present disclosure, the conditional probability distribution is a parameterized distribution, e.g., a vector p of N real numbers. The size N can be node-specific and depends upon the number of incoming edges and probability distribution family. A conditional probability distribution can indicate or represent how a node fault's probability is apriori believed to be caused by the combinations of the incoming dependencies (e.g., propagated faults and system states). For example, the contribution of a node failure can be captured in a conditional probability distribution. The conditional probability distribution can be particular to each node and depend on the represented system element, fault type, and known information/uncertainty. A complete lack of knowledge of the probability can be defined through a random or uniform distribution.

The DAG Bayesian Network can then be further updated or modified by specifying system safety goals. A set or list of safety goals for some nodes can be obtained from a safety concept report derived through established Functional Safety processes, (e.g., ISO26262). A safety goal can be specified in the DAG Bayesian Network as a desired expectation value for the appropriate particular nodes. In one example, a safety goal may specify that a data token's integrity must be protected from unreasonable risk with a desired expectation, such as for example, 99.99% chance of being uncorrupted with the safety goals are annotated at the appropriate graph node that models the data token.

FIG. 5 shows an exemplary representation of a node 500 of a DAG Bayesian Network according to aspects of the present disclosure. As described herein, a node of the DAG Bayesian Network can represent a potential fault at a system element. The exemplary node 500 can include data indicated by the categories following categories: "FaultID" (e.g., fault identification/name of the node) 510a, a Unique reference to a system element 510b, Incoming dependency edges 510c, parameterized conditional probability distribution of a node fault 510d, and a list of annotated safety goals 510e. In the example of FIG. 5, the probability distribution is specified as a conditional probability table (CPT). However, in other cases, the probability distribution may be specified by different mechanisms, such as known parametrized distributions (e.g., Poisson, Normal, etc.) or by a probabilistic program.

An annotated safety goal may include a target value 510e which can be a static real number between 0 and 1, as depicted in FIG. 5. In some cases, the safety goal target value 510e may be dynamic. Further, in some instances, instead of specifying a real number, the safety goal stores or includes a reference to a function that will compute the target value, e.g., at runtime based on the current system state. For example, if the application detects a specific operational design domain (ODD) that requires a higher target goal for a particular fault free task than another ODD.

Referring back to FIG. 2, at 210B, a LUT is created. A lookup table can be created that matches a given a set of known mitigation techniques for identified system to a set of potential candidates at runtime (e.g., faults). The LUT can show a fault potentially addressed by a single or multiple mitigation techniques. FIG. 6 shows one exemplary representation of a LUT 600 showing mitigation techniques 610 mapped to potential fault sources 620.

As explained, the LUT can be used to extend the DAG Bayesian Network created at 210A to incorporate the expected effect of each mitigation technique of the LUT. This can be accomplished by adding an extra system state node that is connected to the affected fault nodes. The conditional probability distributions of the affected nodes are extended and includes foreseen impacts of triggering or not triggering mitigation technique(s). Therefore, the affected or updated conditional probability distributions include information on the reduction or increase of risks due to the introduction of a dynamically triggered mitigation technique in the design, and the activation or non-activation of the mitigation technique(s).

FIG. 7 shows of the node represented in FIG. 5 being updated or extended. As shown in FIG. 7, the conditional probability distribution now includes or accounts for the potential impact of risk mitigation technique(s) mapped to the node.

Referring back to FIG. 2, after creation of the DAG Bayesian Network and the LUT, the process flow can proceed to 220, which includes processes or steps that occur or are implemented during a runtime of the system. At 220C, the process includes computing forward or marginal probabilities using the runtime evidence obtained by the middleware. For example, at runtime of a system, the middleware can provide its dynamic configuration to feed the DAG Bayesian Network, and compute the marginal probabilities of safety goal violations conditioned to the system runtime configuration. FIG. 8 shows an exemplary table 800 including examples of runtime evidence or information that can be provided by the middleware.

According to aspects of the present disclosure, marginal probabilities of incoming faults are computed and conditioned to the known system states, e.g., the ones provided in the middleware runtime configuration. The middleware runtime configuration can include which mitigation techniques are activated and which are not.

Figure 9:
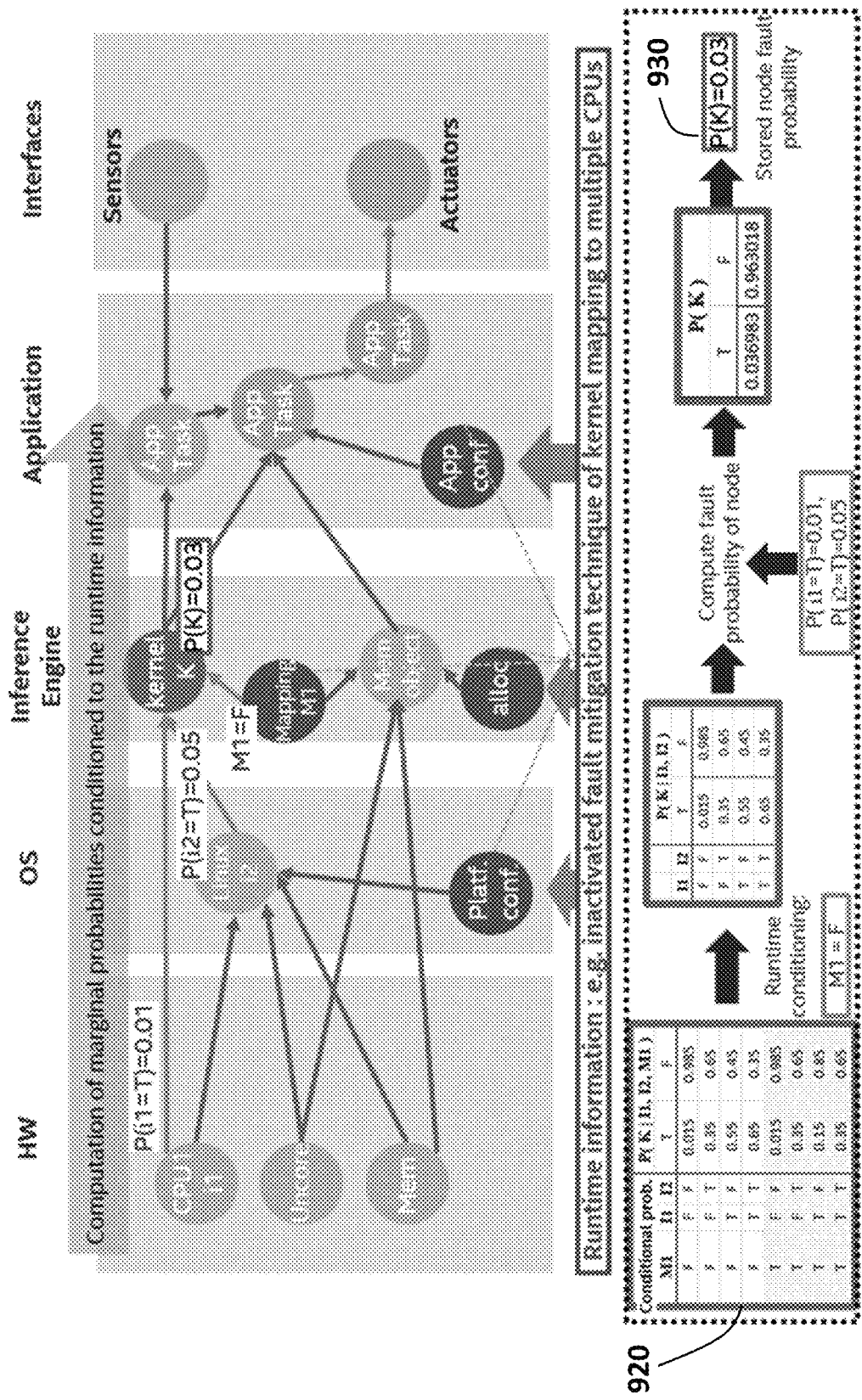
FIG. 9 shows an exemplary illustration of computing marginal probabilities according to aspects of the present disclosure.

FIG. 9 shows an exemplary illustration showing the computation of marginal probabilities 910 using the conditional probability distribution from the extended DAG Bayesian Network. Applying the obtained runtime evidence 920 (e.g., P(i1=T), P(i2=T), M1=F) or information to the DAG Bayesian Network (e.g., using the conditional probability 920) determines or produces marginal probabilities 930 (e.g., P(K)=0.03) at runtime, which incorporate middleware configuration dynamics. The determined or computed marginal probabilities can be stored for each node.

The determined marginal probabilities and its association runtime evidence parameter values (runtime configuration indication) can be stored in an accessible database. Recomputation of marginal probabilities can be avoided if a system configuration occurs again. The computation of the marginal probabilities may be performed each time that the middleware layer reconfigures its parameters and if the new configuration is not found in the stored database.

Referring again to 220 of FIG. 2, during runtime at 220D, mitigation techniques are selected based on identification of the most important or likely fault sources. The computed probabilities can be used for identification of the most likely fault sources. In doing so, the marginal probabilities are used to determine which safety goals are violated. For each safety goal node, if the computed fault risk probability of the node or marginal probability is compared to the safety goal threshold for the node. If the computed marginal probability exceeds the safety violation target goal (e.g., the safety threshold value) for the node, then a set of fault sources that could be potentially mitigated can be considered. This set of fault sources may be identified by using the joint probability distribution (JPD) at the node. A JPD can be created combining the conditional probability distribution of a node with each node's parent's computed marginal probability. A JPD is used to identify select one or more fault sources to be mitigated so as to reduce the risk or likelihood of safety goal violation.

Figure 10:
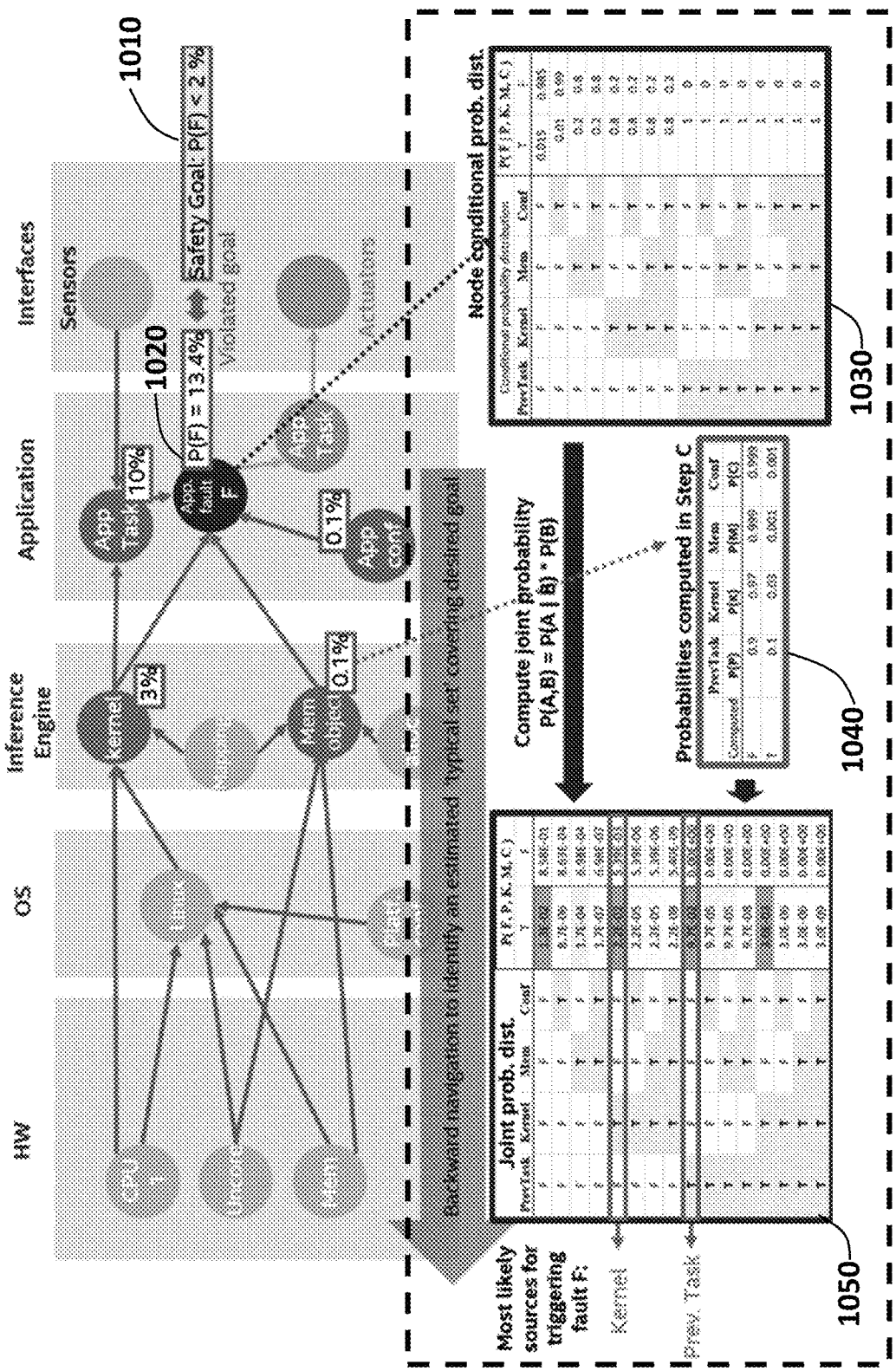
FIG. 10 shows an exemplary representation identifying most likely fault sources according to aspects of the present disclosure.

FIG. 10 shows an exemplary representation showing identification of most likely or probably fault sources (e.g., Kernel and Memory Object nodes). In aspects, the goal may be to identify the most probable faults that may be responsible for all unacceptable safety goal violation risks. As shown in FIG. 10, the likely fault sources are identified using a backwards navigation approach. In this case, the node "F" has an annotated safety goal or threshold 1010 of P(F)<2%. However, the marginal fault probability 1020 is 13.4% in this example, which exceeds the threshold 1010. Thus the safety goal is violated. Accordingly, a joint probability distribution 1050 is used to select a set of fault sources to mitigate such that the safety goal threshold can be achieved. The JPD 1050 in FIG. 10 is determined using the node F's conditional probability distribution 1030 and the marginal probabilities of the parents of node F, 1040. The JPD 1050 is used to select a set of fault sources to be mitigated so that the safety goal threshold is not exceeded. In the case of JPD 1050, the "Kernel" and "Previous Task" are the identified fault sources.

Figure 11:
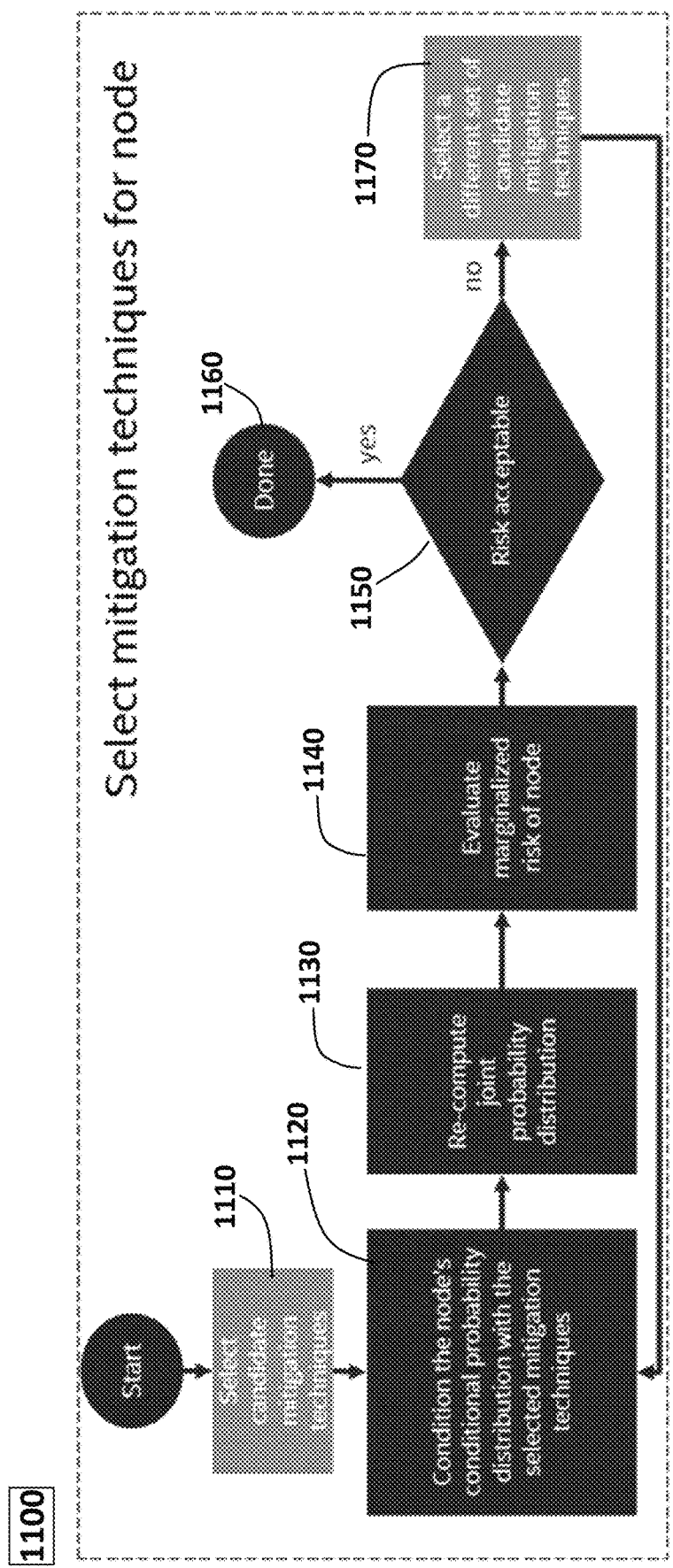
FIG. 11 shows an exemplary method for selecting mitigation sources for a node according to aspects of the present disclosure.

From the identification of the most probable fault sources, a selection of mitigation techniques for reducing the likelihood of violating the goal and not exceeding the specified safety threshold can be performed. FIG. 11 shows one exemplary method 1100 for selecting mitigation sources for a node in which the computed or determined marginal probability exceeds the safety threshold value. The method 1100 includes selecting a set of candidate or potential mitigation techniques for activation at 1110. After the selection of a candidate set of risk mitigation techniques, at 1120, the method includes conditioning or modifying the parameterized conditional probability distribution based on the selected set of candidate mitigation techniques for the node. After the condition, the joint probability distribution is recalculated at 1130. Then, at 1140, the method includes determining a new marginal probability distribution using the recomputed JPD. Then at 1150, if it is determined whether the new marginal probability of the node is less than safety threshold value. If so, then the process is finished with the selected candidate mitigation techniques activated at 1160. However, if the comparison shows that the safety value threshold for the node is still exceeded, then at 1170 a new or different set of candidate mitigation technique is selected.

In short, for the method of FIG. 11, after a mitigation technique is found for each selected node, the joint probability distribution is recomputed with the node's conditional probability distribution now conditioned to activate the mitigation technique nodes. If the resulting risk (marginal probability) meets the desired safety goal the search for risk mitigation techniques is over or complete. Middleware can be informed or directed to implement or activate the selected mitigation techniques. In some cases, the middleware can be configured to interface with the LUT so that a reference to a given fault mitigation technique from the LUT can be mapped into a set of necessary execution steps for its implementation, e.g., run the OS specific system calls or write the specific system configuration.

Figure 12:
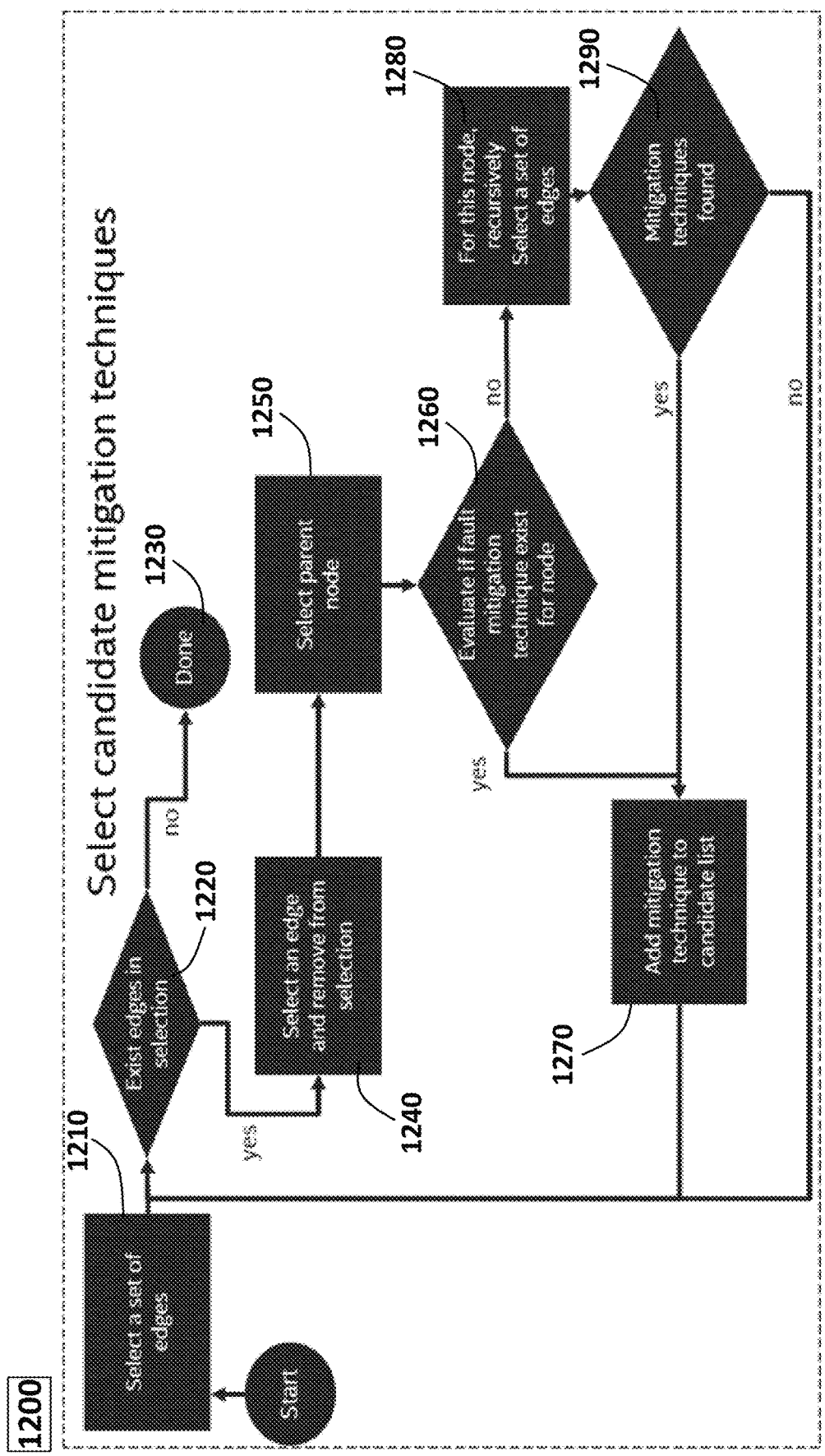
FIG. 12 shows an exemplary method for selecting candidate mitigation techniques.

FIG. 12 shows an exemplary method 1200 for selecting a candidate set of mitigation techniques. The method 1200 includes selecting a first or initial set of edges for the node at 1210. Then at 1220, the method includes evaluating whether any edges are found in the selection. (This step or action may be done for subsequent iterations and may not be necessary for a first iteration.) If none are found, the process stops at 1230 as no edges exist for consideration. If edges remain from the initial selection or list, then at 1240 one of the edges is selected and removed from the list or initial selection of selected edges at 1210. The parent node of the selected edge is selected at 1250 and at 1260 this parent node is evaluated for available risk mitigation techniques at 1260. That is, if a risk mitigation exists for the selected parent node, then the mitigation technique is added to a candidate list. If no risk mitigation exists, then at 1280 the node recursively searched for a selection of edges and that lead to a found mitigation technique at 1290. The mitigation technique recursively found can be added to the candidate list. This process can then be repeated for the other existing edges, starting again at 1220 until each edge is searched for a mitigation technique.

While FIG. 12 implements a recursive search for finding mitigation techniques, other approaches can be used. One example is a breadth-first approach that may be used to selecting the most significant contributor first, and if the target is not reached after its evaluation, select the next most significant, and so on. Another example would be an A* search, or a hierarchical search, where a heuristic based on the maximum potential risk reduction is first used as the total cost to reach the target.

Referring back to FIG. 2, if after having triggered the mitigation techniques selected at 220D, the safety goal is observed to be violated by a fault monitor, the model beliefs are updated through Bayesian inference, e.g. with an approximated posterior information at 220E.

Therefore, according to aspects to the present disclosure, to select a candidate set of risk mitigation techniques involves choosing a set of input edges to the node (which the safety value is exceeded) can be selected and stored in a candidate list through a predetermined or predefined policy having the objective to reduce the probability of the safety goal to below the safety threshold or target value. For example, a set of edges can be selected to reach the target goal instead of simply selecting an edge having the highest probability. A set of edges can be selected to ensure the risk will be reduced enough as merely selecting the edge with highest probability does not necessarily reduce the risk sufficiently enough.

Figure 13:
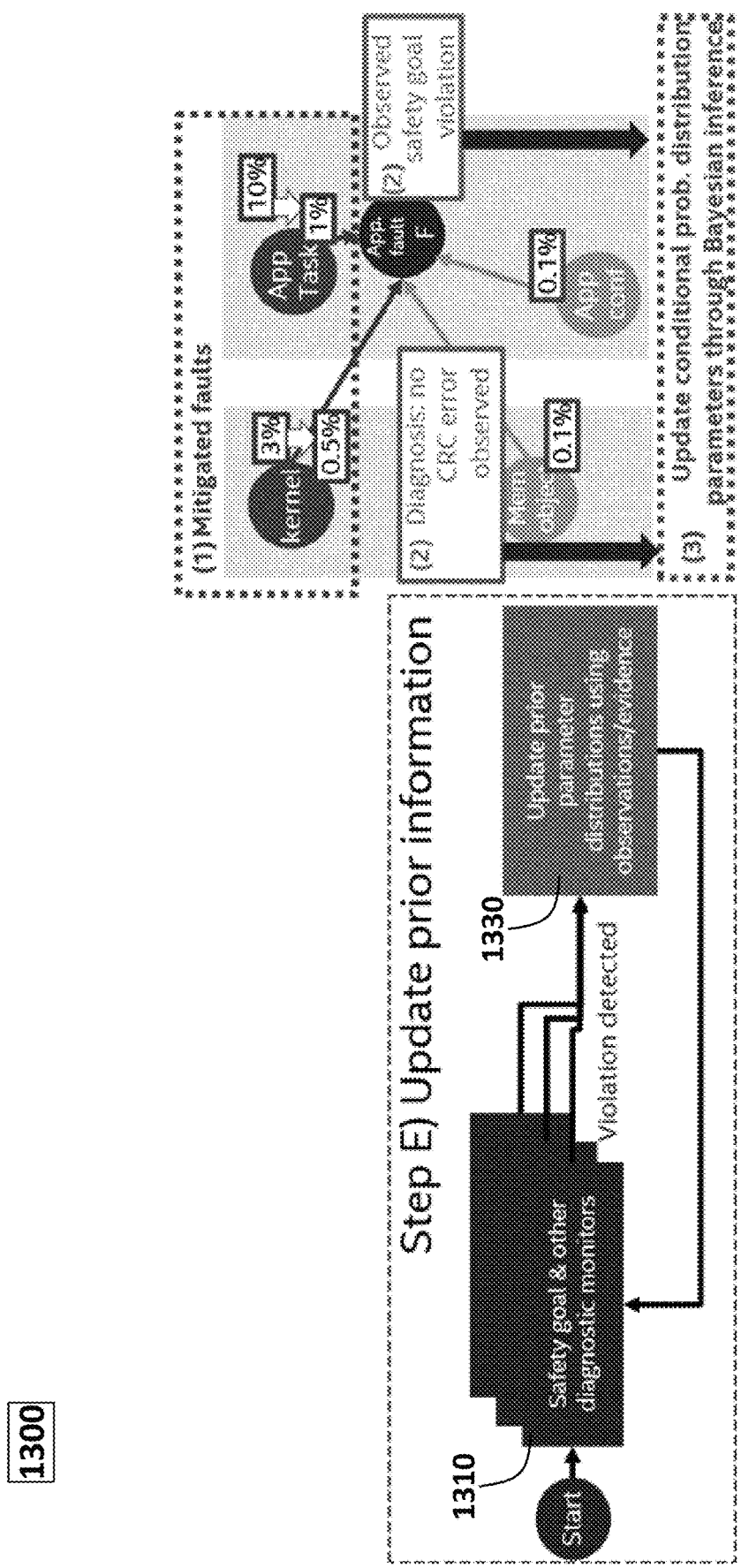
FIG. 13 shows an exemplary process for updating Bayesian Networks according to aspects of the present disclosure.

FIG. 13 shows an exemplary process for updating a DAG Bayesian Networks according to aspects of the present disclosure. The process starts at 1310, where safety goal and/or diagnostics monitors are detecting whether there is a safety goal violation occurs. If a safety goal violation is observed that was supposed to be covered by the selected and activated mitigation technique(s), then the prior belief or the conditional probabilities can then be updated through the use Bayesian inference using the evidence available. The available evidence may include, for example, known system state and data from hardware and/or software diagnostics. In some examples, a variational inference approach may be used to update the parameters p that define the conditional probability distribution on the fault dependencies of the observed fault.

In aspects of the present disclosure, the DAG Bayesian Network can be updated to reflect updates the hardware and/or software of the system. For example, the nodes and edges of the DAG Bayesian Network may be updated modularly. This updates can include the inclusion, deletion, and/or of modification of edges, as well as updates to the conditional probability distributions in each directly affected node.

Figure 14:
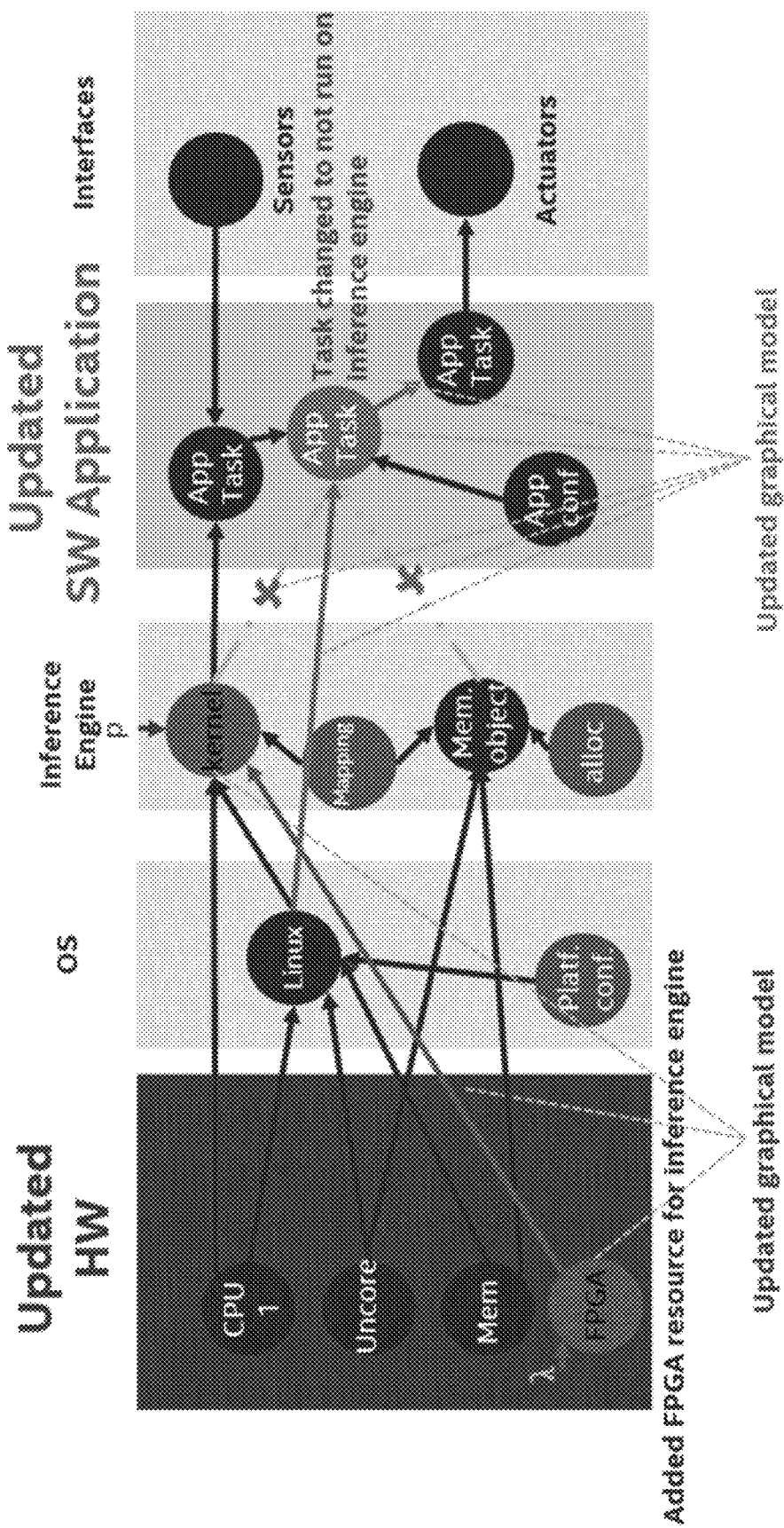
FIG. 14 shows an exemplary representation of a Bayesian Network in accordance with aspects of the present disclosure.

FIG. 14 shows an example of the updates to the DAG Bayesian Network of FIGS. 3 and 9. Updates to the DAG Bayesian Network may also results from new error or vulnerability databases for hardware and software.

Figure 15:
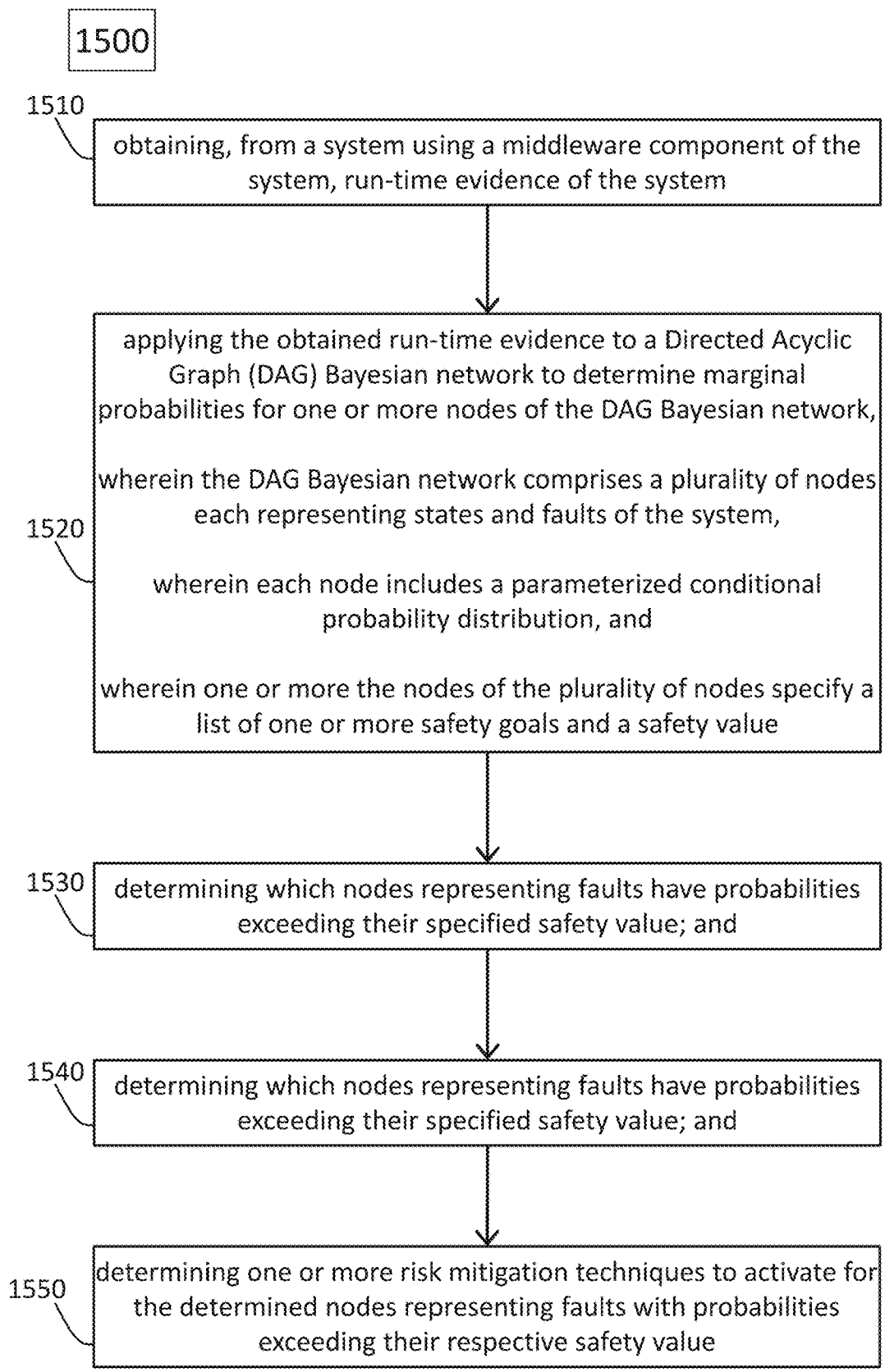
FIG. 15 shows an exemplary method according to aspects of the present disclosure.

FIG. 15 shows a method 1500 that may be performed in accordance with various aspects of the present disclosure. The method 1500 includes at 1510, obtaining, from a system using a middleware component of the system, run-time evidence of the system. Then at 1520, applying the obtained run-time evidence to a Directed Acyclic Graph (DAG) Bayesian network to determine marginal probabilities for one or more nodes of the DAG Bayesian network, wherein the DAG Bayesian network comprises a plurality of nodes each representing states and faults of the system, wherein each node includes a parameterized conditional probability distribution, and wherein one or more the nodes of the plurality of nodes specify a list of one or more safety goals and a safety value.

At 1530, the method 1500 includes determining which nodes representing faults have probabilities exceeding their specified safety value. Next, at 1550, the method 1500 includes determining one or more risk mitigation techniques to activate for the determined nodes representing faults with probabilities exceeding their respective safety value.

The following examples pertain to further aspects of this disclosure:

Example 1 is a computer-implemented method including: obtaining, from a system using a middleware component of the system, run-time evidence of the system; applying the obtained run-time evidence to a Directed Acyclic Graph (DAG) Bayesian network to determine marginal probabilities for one or more nodes of the DAG Bayesian network, wherein the DAG Bayesian network comprises a plurality of nodes each representing states and faults of the system, wherein each node includes a parameterized conditional probability distribution, and wherein one or more of the nodes of the plurality of nodes specify a list of one or more safety goals and a safety value; determining which nodes representing faults have probabilities exceeding their specified safety value; and determining one or more risk mitigation techniques to activate for the determined nodes representing faults with probabilities exceeding their respective safety value.

Example 2 is the subject matter of Example 1, wherein the parameterized conditional probability distribution can indicate an a-priori probability of the node representing a set of possible values indicating a presence or absence of a particular fault or system state.

Example 3 is the subject matter of Example 2, wherein the parameterized conditional probability is conditioned by a combination of possible values of all incoming dependencies.

Example 4 is the subject matter of Example 2 or 3, wherein the parameterized conditional probability distribution for each respective node of the DAG Bayesian Network can further indicate a conditional probability distribution of affected nodes including all possible value combinations comprising values from mitigation techniques identified from a look-up-table (LUT) data structure indicating a mapping of one or more risk mitigation techniques to one or more of the nodes.

Example 5 is the subject matter of Example 4, wherein the LUT data structure indicates mitigation techniques can include a technique to switch to a particular algorithm, re-execute a hardware or software routine, and switch to a different kernel for an application execution.

Example 6 is the subject matter of Example 4 or 5, wherein determining the one or more risk mitigation techniques to activate can include: identifying fault sources for the nodes representing a fault and determined to have a probability exceeding its safety value; and determining risk mitigation techniques for the identified likely fault sources from the data structure.

Example 7 is the subject matter of Example 6, wherein identifying the fault sources for the nodes representing a fault and determined to have a probability exceeding its safety value can include: determining a joint probability distribution of all incoming dependencies for each node; and identifying for each node, using the determined joint probability distribution, the one or more most probable fault sources for the node representing a fault exceeding its specified safety value.

Example 8 is the subject matter of Example 7, wherein determining a joint probability distribution for each node representing faults exceeding its specified safety value can include using the parameterized conditional probability distribution and the determined probability of each of its parent nodes.

Example 9 is the subject matter of any of Examples 4 to 8, wherein determining the one or more risk mitigation techniques to activate, for each respective node representing a fault determined to exceed its specified safety value can include performing for one or more iterations: selecting a set of candidate mitigation techniques from the LUT data structure based on the identified fault sources for the respective node; conditioning the parameterized conditional probability distribution based on the selected set of candidate mitigation techniques; determining a new marginal probability distribution using the conditioned parameterized conditional probability distribution; and determining whether the probability of the respective node is less than the goal safety value based on the newly determined marginal probability distribution.

Example 10 is the subject matter of Example 9, wherein selecting the set of candidate mitigation techniques from the LUT data structure for a plurality of iterations can include: selecting one or more parent nodes of the respective node according to an iterative depth search of the DAG Bayesian Network; and selecting mitigation techniques candidates mapped to the selected parent nodes and respective node as the selected set of candidate mitigation techniques.

Example 11 is the subject matter of Example 9, wherein selecting the set of candidate mitigation techniques from the LUT data structure for a plurality of iterations can include: selecting one or more parent nodes of the respective node from the DAG Bayesian Network according to a breadth first type search; and selecting mitigation techniques candidates mapped to the selected parent nodes and respective node as the selected set of candidate mitigation techniques.

Example 12 is the subject matter of Example 10 or 11, wherein the one or more parent nodes can be selected to reduce the probability of a safety goal violation.

Example 13 is the subject matter of Example 9, which can further include: determining that marginal probability of the respective node is less than the safety value based on the recomputed marginal probability distribution, and activating the selected set of candidate mitigation techniques associated with the recomputed marginal probability distribution.

Example 14 is the subject matter of Example 13, wherein activating the selected set of candidate mitigation techniques can include implementing the set of candidate mitigation techniques in the middleware component.

Example 15 is the subject matter of any of Examples 1 to 13, which may further include: determining a violation of safety goal after implementation of the selected mitigation techniques; updating one or more beliefs the DAG Bayesian network based on the determined instance using Bayesian inference.

Example 16 is a non-transitory computer-readable comprising instructions that when executed by one or more processors, cause the one or more processors to execute the method of any of Examples 1-15.

Example 1A is a diagnostic system including: a Directed Acyclic Graph (DAG) Bayesian Network stored in an accessible storage device corresponding to a fault model of a system, the Bayesian network comprising a plurality of nodes each representing states and faults of the system, wherein each node includes a parameterized conditional probability distribution, and wherein one or more the nodes of the plurality of nodes specify a list of safety goals with a safety value; a look-up-table (LUT) data structure stored in a storage device including data indicating a mapping one or more risk mitigation techniques to one or more of the nodes; a middleware component configured to obtain run-time evidence; at least one processor operably coupled to the middleware component, the DAG Bayesian Network, and the LUT data structure, the at least one processor configured to: obtain from the middleware component the obtained run-time evidence; determine marginal probabilities for one or more nodes of the DAG Bayesian Network by applying the obtained run-time-evidence to the DAG Bayesian network; determine which nodes representing faults have probabilities exceeding their specified safety value; and determine one or more risk mitigation techniques to activate for the determined nodes representing faults with probabilities exceeding their respective safety value.

Example 2A is the subject matter of Example 1, wherein the parameterized conditional probability distribution can indicate an a-priori probability of the node representing a set of possible values indicating a presence or absence of a particular fault or system state.

Example 3A is the subject matter of Example 2A, wherein the parameterized conditional probability can be conditioned by a combination of possible values of all incoming dependencies.

Example 4A is the subject matter of Example 2A, wherein the parameterized conditional probability distribution for each respective node of the DAG can further indicate a conditional probability distribution of affected nodes including all possible value combinations comprising values from mitigation techniques identified from the LUT data structure.

Example 5A is the subject matter of any of Examples 1A to 4A, wherein the LUT data structures indicates mitigation techniques can include a technique to switch to a particular algorithm, re-execute a hardware or software routine, and switch to a kernel to different kernel for an application execution.

Example 6A is the subject matter of any of Examples 1A to 5A, wherein determining the one or more risk mitigation techniques to activate can include: identifying fault sources for the nodes representing a fault and determined to have a probability exceeding its safety value; and determining risk mitigation techniques for the identified likely fault sources.

Example 7A is the subject matter of Example 6A, wherein to identify the fault sources for the nodes representing a fault and determined to have a probability exceeding its safety value comprises the at least one processor to: determine a joint probability distribution of all incoming dependencies for each node; and identify for each node, using the determined joint probability distribution, the one or more most probable fault sources for the node representing a fault exceeding its specified safety value.

Example 8A is the subject matter of Example 7A, wherein to determine a joint probability distribution for each node representing faults exceeding its specified safety value can include using the parameterized conditional probability distribution and the determined probability of each of its parent nodes.

Example 9A is the subject matter of Example 5A, wherein to determine the one or more risk mitigation techniques to activate, for each respective node representing a fault determined to exceed its specified safety value can include the at least one processor to perform the following for one or more iterations: select a set of candidate mitigation techniques from the LUT data structure based on the identified fault sources for the respective node; condition the parameterized conditional probability distribution based on the selected set of candidate mitigation techniques; determine a new marginal probability distribution using the conditioned parameterized conditional probability distribution; and determine whether probability of the respective node is less than safety value based on the newly determined marginal probability distribution.

Example 10A is the subject matter of Example 9A, wherein to select the set of candidate mitigation techniques from the LUT data structure for a plurality of iterations can include to: select one or more parent nodes of the respective node according to an iterative depth search of the DAG Bayesian Network; and select mitigation techniques candidates mapped to the selected parent nodes and respective node as the selected set of candidate mitigation techniques.

Example 11A is the subject matter of Example 9A, wherein to select the set of candidate mitigation techniques from the LUT data structure for a plurality of iterations can include to: select one or more parent nodes of the respective node from the DAG Bayesian Network according to a breadth first type search; and select mitigation techniques candidates mapped to the selected parent nodes and respective node as the selected set of candidate mitigation techniques.

Example 12A is the subject matter of Example 10A or 11A, wherein the one or more parent nodes can be selected to reduce the probability of a safety goal violation.

Example 13A is the subject matter of Example 9A, wherein the one or more processors can be further configured to: determine that marginal probability of the respective node is less than the safety value based on the recomputed marginal probability distribution, and activate the selected set of candidate mitigation techniques associated with the recomputed marginal probability distribution in the middleware component.

Example 14A is the subject matter of Example 13A, wherein the middleware component is configured to implement the activated selected set of candidate mitigation techniques.

Example 15A is the subject matter of any of Examples 1A to 14A, wherein the middleware component is configured to detect a violation of safety goal after implementation of the selected mitigation techniques; and wherein the at least one processor is configured to update one or more beliefs the DAG Bayesian network based on the determined instance using Bayesian inference.

Example 1B is a diagnostic system including: means for determining and obtaining, run-time evidence of a system; means for applying the obtained run-time evidence to a Directed Acyclic Graph (DAG) Bayesian network to determine marginal probabilities for one or more nodes of the DAG Bayesian network, wherein the DAG Bayesian network comprises a plurality of nodes each representing states and faults of the system, wherein each node includes a parameterized conditional probability distribution, and wherein one or more the nodes of the plurality of nodes specify a list of one or more safety goals and a safety value; means for determining which nodes representing faults have probabilities exceeding their specified safety value; and means for determining one or more risk mitigation techniques to activate for the determined nodes representing faults with probabilities exceeding their respective safety value.

It should be noted that one or more of the features of any of the examples above may be combined with any one of the other examples. It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include a one or more components configured to perform each aspect of the related method.

The foregoing description has been given by way of example only and it will be appreciated by those skilled in the art that modifications may be made without departing from the broader spirit or scope of the invention as set forth in the claims. The specification and drawings are therefore to be regarded in an illustrative sense rather than a restrictive sense. The scope of the disclosure is also indicated by the appended claims and all changes which come within the meaning and range of equivalency of the claims are therefore intended to be embraced.

What is claimed is:
1. A computer-implemented method comprising:
obtaining, from a system using a middleware component of the system, run-time evidence of the system;
applying the obtained run-time evidence to a Directed Acyclic Graph (DAG) Bayesian network to determine marginal probabilities for one or more nodes of the DAG Bayesian network;
determining which of the nodes of the DAG Bayesian network representing faults have probabilities exceeding their specified safety value; and
determining one or more risk mitigation techniques to activate for the determined nodes,
wherein the DAG Bayesian network comprises a plurality of nodes each representing states and faults of the system, wherein each node includes a parameterized conditional probability distribution, and wherein one or more of the nodes of the plurality of nodes specify a list of one or more safety goals and a safety value, wherein the parameterized conditional probability distribution indicates an a-priori probability of the node representing a set of possible values indicating a presence or absence of a particular fault or system state, wherein the parameterized conditional probability distribution for each respective node of the DAG Bayesian Network further indicates a conditional probability distribution of affected nodes including all possible value combinations comprising values from mitigation techniques identified from a look-up-table (LUT) data structure indicating a mapping of one or more risk mitigation techniques to one or more of the nodes.

2. The computer implemented method of claim 1, wherein the parameterized conditional probability distribution is conditioned by a combination of possible values of all incoming dependencies.

3. The computer implemented method of claim 1, wherein determining the one or more risk mitigation techniques to activate comprises:
identifying likely fault sources for the nodes representing a fault and determined to have a probability exceeding its safety value; and
determining risk mitigation techniques for the identified likely fault sources from the LUT data structure.

4. The computer implemented method of claim 3, wherein identifying the likely fault sources for the nodes representing a fault and determined to have a probability exceeding its safety value comprises:
determining a joint probability distribution of all incoming dependencies for each node; and
identifying for each node, using the determined joint probability distribution, one or more most probable fault sources for the node representing a fault exceeding its specified safety value.

5. The computer implemented method of claim 4, wherein determining a joint probability distribution for each node representing faults exceeding its specified safety value comprises using the parameterized conditional probability distribution and the determined probability of each of its parent nodes.

6. The computer implemented method of claim 1, wherein determining the one or more risk mitigation techniques to activate, for each respective node representing a fault determined to exceed its specified safety value comprises performing for one or more iterations:
selecting a set of candidate mitigation techniques from the LUT data structure based on the identified fault sources for the respective node;
conditioning the parameterized conditional probability distribution based on the selected set of candidate mitigation techniques;
determining a new marginal probability distribution using the conditioned parameterized conditional probability distribution; and
determining whether the probability of the respective node is less than the safety value based on the newly determined marginal probability distribution.

7. The computer implemented method of claim 6 further comprising:
determining that marginal probability of the respective node is less than the safety value based on the newly determined marginal probability distribution, and
activating the selected set of candidate mitigation techniques associated with the newly determined marginal probability distribution.

8. A diagnostic system comprising: a Directed Acyclic Graph (DAG) Bayesian Network stored in an accessible storage device corresponding to a fault model of a system; a middleware component configured to obtain run-time evidence; at least one processor operably coupled to the middleware component and the DAG Bayesian Network, the at least one processor configured to: obtain, from the middleware component, the obtained run-time evidence; determine marginal probabilities for one or more nodes of the DAG Bayesian Network; determine which nodes of the DAG Bayesian Network representing faults have probabilities exceeding their specified safety value; and determine one or more risk mitigation techniques to activate for the determined nodes representing faults with probabilities exceeding their respective safety value, wherein the DAG Bayesian network comprises a plurality of nodes each representing states and faults of the system, wherein each node includes a parameterized conditional probability distribution, and wherein one or more the nodes of the plurality of nodes specify a list of safety goals with a safety value, and wherein to determine marginal probabilities for one or more nodes of the DAG Bayesian Network comprises to apply the obtained run-time-evidence to the DAG Bayesian network wherein to determine the one or more risk mitigation techniques to activate, for each respective node representing a fault determined to exceed its specified safety value comprises the at least one processor to perform the following for one or more iterations: select a set of candidate mitigation techniques from a LUT data structure based on identified fault sources for the respective node; condition the parameterized conditional probability distribution based on the selected set of candidate mitigation techniques; determine a new marginal probability distribution using the conditioned parameterized conditional probability distribution; and determine whether probability of the respective node is less than the safety value based on the newly determined marginal probability distribution.

9. The diagnostic system of claim 8, wherein the at least one processor configured to determine marginal probabilities for one or more nodes of the DAG Bayesian Network comprises the at least one processor to apply the obtained run-time-evidence to the DAG Bayesian network.

10. The diagnostic system of claim 9, wherein the parameterized conditional probability distribution indicates an a-priori probability of the node representing a set of possible values indicating a presence or absence of a particular fault or system state.

11. The diagnostic system of claim 10, wherein the parameterized conditional probability distribution is conditioned by a combination of possible values of all incoming dependencies.

12. The diagnostic system of claim 10, further comprising: a look-up-table (LUT) data structure stored in a storage device including data indicating a mapping one or more risk mitigation techniques to one or more of the nodes, the at least one processor further operably coupled to the LUT data structure, wherein the parameterized conditional probability distribution for each respective node of the DAG Bayesian Network further indicates a conditional probability distribution of affected nodes including all possible value combinations comprising values from mitigation techniques identified from the LUT data structure, wherein the DAG Bayesian network comprises a plurality of nodes each representing states and faults of the system, wherein each node includes a parameterized conditional probability distribution, and wherein one or more the nodes of the plurality of nodes specify a list of safety goals with a safety value, and wherein to determine marginal probabilities for one or more nodes of the DAG Bayesian Network comprises to apply the obtained run-time-evidence to the DAG Bayesian network, wherein to determine the one or more risk mitigation techniques to activate, foreach respective node representing a fault determined to exceed its specified safety value comprises the at least one processor to perform the following for one or more iterations: select a set of candidate mitigation techniques from a LUT data structure based on identified fault sources for the respective node; condition the parameterized conditional probability distribution based on the selected set of candidate mitigation techniques; determine a new marginal probability distribution using the conditioned parameterized conditional probability distribution; and determine whether probability of the respective node is less than the safety value based on the newly determined marginal probability distribution.

13. The diagnostic system of claim 8, wherein to select the set of candidate mitigation techniques from the LUT data structure for a plurality of iterations comprises to:
    select one or more parent nodes of the respective node according to an iterative depth search of the DAG Bayesian Network; and
    select mitigation techniques candidates mapped to the selected parent nodes and respective node as the selected set of candidate mitigation techniques.

14. A non-transitory computer-readable medium_comprising instructions that when executed by one or more processors, cause the one or more processors to obtain, from a system using a middleware component of the system, run-time evidence of the system;
    determine marginal probabilities for one or more nodes of a DAG Bayesian network, wherein the DAG Bayesian network comprises a plurality of nodes each representing states and faults of the system, wherein each node includes a parameterized conditional probability distribution, and wherein one or more the nodes of the plurality of nodes specify a list of safety goals with a safety value;
    determine which nodes of the DAG Bayesian network representing faults have probabilities exceeding their specified safety value; and
    determine one or more risk mitigation techniques to activate for the determined nodes representing faults with probabilities exceeding their respective safety value,
    wherein the parameterized conditional probability distribution indicates an a-priori probability of each node representing a set of possible values indicating a presence or absence of a particular fault or system state, and wherein the parameterized conditional probability is conditioned by a combination of possible values of all incoming dependencies.

15. The computer-readable medium of claim 14,
    wherein to determine marginal probabilities for one or more nodes of the DAG Bayesian Network comprises to apply the obtained run-time-evidence to the DAG Bayesian network.

* * * * *